(12) United States Patent
Kaye et al.

(10) Patent No.: US 7,981,241 B2
(45) Date of Patent: Jul. 19, 2011

(54) METHOD FOR FORMING A FEATURE IN A PIECE OF COMPOSITE MATERIAL

(75) Inventors: Allan Kaye, Bristol (GB); Ian L Gray, Bristol (GB)

(73) Assignee: Airbus Operations Limited, Bristol (GB)

( * ) Notice: Subject to any disclaimer, the term of this patent is extended or adjusted under 35 U.S.C. 154(b) by 680 days.

(21) Appl. No.: 11/905,907

(22) Filed: Oct. 5, 2007

(65) Prior Publication Data

US 2008/0115887 A1  May 22, 2008

(30) Foreign Application Priority Data

Nov. 22, 2006 (GB) .................................... 0623328.2

(51) Int. Cl.
*B29C 65/00* (2006.01)
*B32B 37/00* (2006.01)
(52) U.S. Cl. ............... 156/307.1; 156/256; 156/289; 156/307.7
(58) Field of Classification Search .......... 156/152, 156/250, 256, 289, 307.1, 307.7
See application file for complete search history.

(56) References Cited

U.S. PATENT DOCUMENTS

| 108,781 | A | * | 11/1870 | Hamilton ..................... 52/313 |
| 3,977,933 | A | * | 8/1976 | Sadashige ................... 156/250 |
| 4,255,684 | A | | 3/1981 | Mischler et al. |
| 4,364,100 | A | * | 12/1982 | Edmonds et al. ........... 361/739 |
| 6,746,755 | B2 | * | 6/2004 | Morrison et al. ........... 428/166 |
| 2005/0102814 | A1 | | 5/2005 | Anderson et al. |
| 2006/0162851 | A1 | * | 7/2006 | Engel et al. ................. 156/153 |

FOREIGN PATENT DOCUMENTS

DE  196 17 699  11/1997
WO  00/28381  5/2000

OTHER PUBLICATIONS

European Search Report dated Jan. 27, 2007.

* cited by examiner

*Primary Examiner* — John L Goff, II
(74) *Attorney, Agent, or Firm* — Nixon & Vanderhye P.C.

(57) ABSTRACT

A method of forming a piece from a composite material is disclosed in which a mandrel is used that reduces relative movement between the mandrel and the piece during the curing process.

12 Claims, 4 Drawing Sheets

METHOD FOR FORMING A FEATURE IN A PIECE OF COMPOSITE MATERIAL

This application claims priority to GB 0623328.2 filed Nov. 22, 2006, the entire contents of which is hereby incorporated by reference.

FIELD OF INVENTION

The present invention relates to a method for forming a feature in a piece of composite material.

BACKGROUND OF THE INVENTION

Composite materials have many applications, which include aircraft structures such as fuselage or wing panels. One method of manufacturing articles or pieces from composite material involves laminating a sheet material using a resin to bond the layers of the laminate together. Laminate materials include non-metallic materials such as glass fibre, boron fibre, carbon fibre, Kevlar™ and graphite or metallic materials such as aluminium, titanium or magnesium. Suitable resins include, epoxy, bismaleimide, polyimide, polyester, phenolic and thermoplastic resins.

When manufacturing a composite piece it is common to form features in the piece such as rebated or shaped edges or apertures. While it is possible to machine such features into a piece, such post-cure manufacturing operations carry a risk of damage to the composite piece. Therefore, it is preferable to form the features into the piece during the laminating process thus reducing post-cure manufacturing operations. One problem with pre-forming features in a piece is that it may introduce anomalies such as kinks in the plies within the laminate or air pockets in the resin. Such anomalies can significantly degrade the performance to the finished piece.

SUMMARY OF THE INVENTION

An embodiment of the invention provides a method for forming a feature in a piece of composite material, the method comprising the steps of:
a) laying a first set of composite layers for a piece on a tool surface;
b) removing a first part of the first set of composite layers;
c) inserting a first mandrel in place of the removed first part of the first set of composite layers, the first mandrel being arranged to conform to a feature to be formed in the piece and having substantially the same rate of compaction during curing as the removed first part of the set of composite layers;
d) laying a second set of composite layers for the piece over the first set of composite layers and the first mandrel; and
e) curing the piece.

The first mandrel may comprise composite layers. The first mandrel may be formed from the removed first part of the first set of composite layers. The removed first part of the first set of composite layers may be wrapped in release film. One or more layers may be removed from the removed first part of the first set of composite layers prior to forming the first mandrel. The tool surface may comprise a first rebate and the first mandrel conforms to the first rebate and comprises a lower part formed from the removed first part of the first set of composite layers and an upper fixed part conforming to the feature to be formed in the piece, the removed first part of the first set of composite layers being the part of the first set of composite layers laid over the first rebate. The first rebate may form a trough, the first set of composite layers is laid across the trough and the second set of layers is omitted so as to enable the first mandrel to form an aperture in the piece.

The first rebate may be arranged to form a first trough within a second rebate in the form of a second trough and the method comprising the further steps of:
f) prior to laying the second set of composite layers, removing the second part of the first set of composite layers laid over the second rebate and inserting a second mandrel in the second trough, the second mandrel comprising a lower part formed from the removed second part of the first set of composite layers and an upper fixed part conforming to the second trough; and
g) after laying the second set of composite layers and prior to curing the piece, removing a part of the second set of composite layers and adding the removed part of the second set of layers to the lower part of the first mandrel.

The second rebate may be formed in two parts running either side of the first rebate. The second rebate may run continuously around the first rebate. The composite material may comprise a thermoplastic resin and the curing step may comprise the setting of the thermoplastic resin.

Another embodiment of provides a method for forming a piece of composite material to include a formed feature, the method comprising the steps of:
a) laying a first set of composite layers for a piece on a tool surface;
b) removing a part of the first set of composite layers;
c) forming a mandrel from the removed part of the first set of layers wrapped in a release film, the mandrel conforming to a feature to be formed in the piece;
d) inserting the mandrel in place of the removed part of the first set of composite layers;
e) laying a second set of composite layers for the piece over the first set of composite layers and the mandrel; and
f) curing and finishing the piece.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
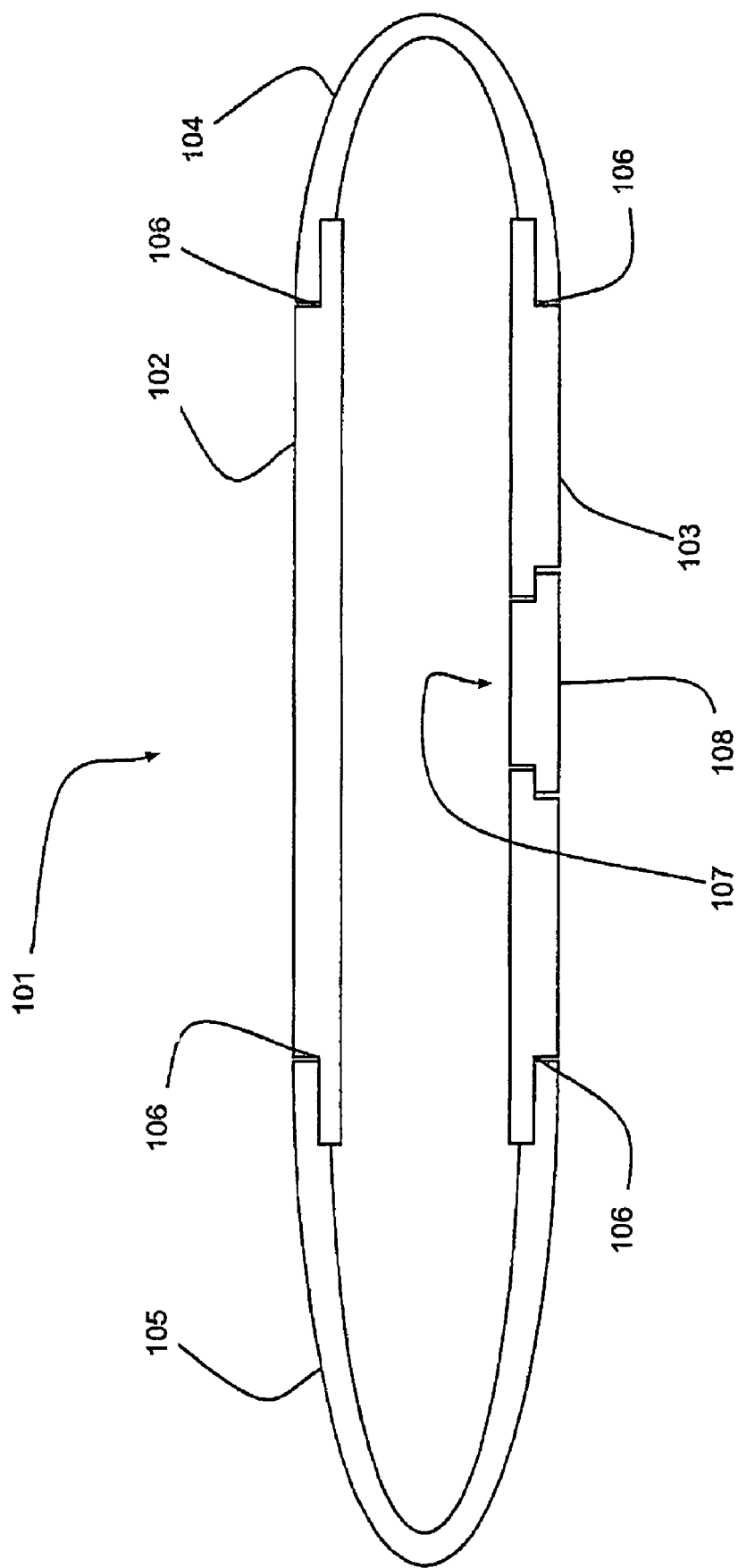
FIG. 1 is a cross sectional view of an aircraft structure, in the form of a wing.

With reference to FIG. 1, an aircraft structure 101, in the form of an aircraft wing, comprises an upper panel 102, a lower panel 103, a leading edge structure 104 and a trailing edge structure 105. The upper and lower panels 102, 103 are in the form of upper and lower wing cover panels, which provide the main aerofoil surfaces of the wing 101. The leading and trailing edge structures 104, 105 are fixed, by conventional means, to the leading and trailing edges of each of the wing cover panels 102, 103. The leading and trailing edges of each of the wing cover panels 102, 103 are provided with rebates 106 which conform to similar structures on the adjoining parts of the leading and trailing edge structures 104, 105. The lower wing cover panel 103 comprises an aperture 107, which is closed by an access panel 108. The aperture 107 provides access for inspection of the interior of the wing 101. The rim of the aperture 107 and the access panel 108 are correspondingly rebated so that when the access panel 108 is in place in the aperture, the outer surface of the access panel substantially conforms to the aerofoil surface of the wing cover panel 103.

Figure 2A:
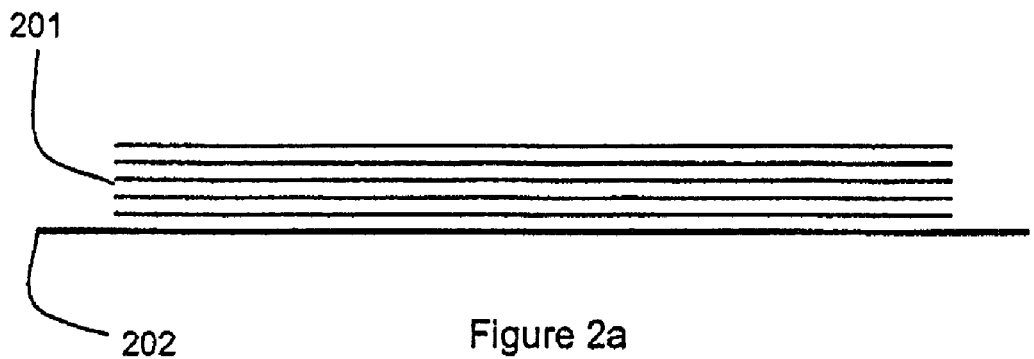
FIGS. 2a to 2d are a set of cross sectional views illustrating a first process for forming a rebate in a composite panel for use in the wing of FIG. 1.
Figure 2B:
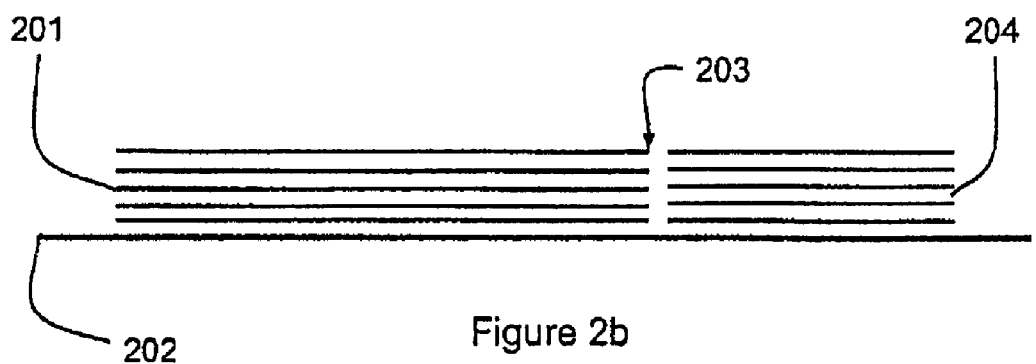
Figure 2C:
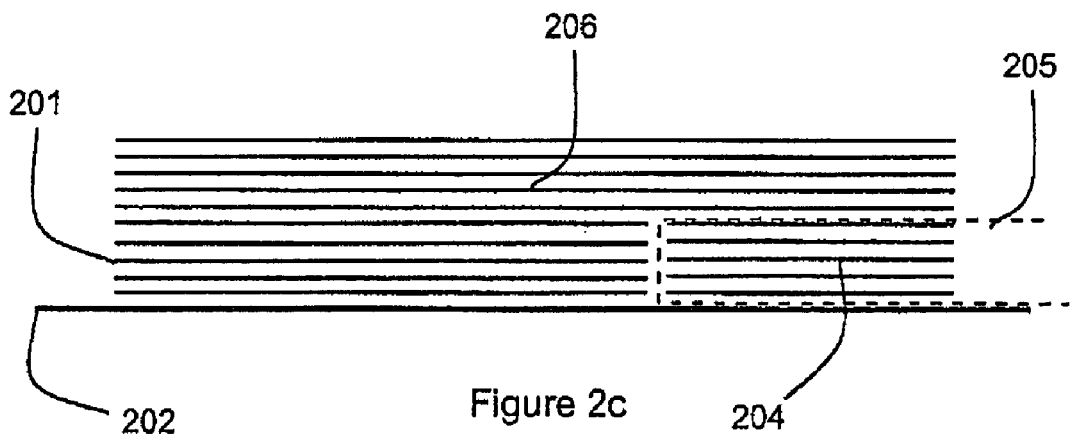
Figure 2D:
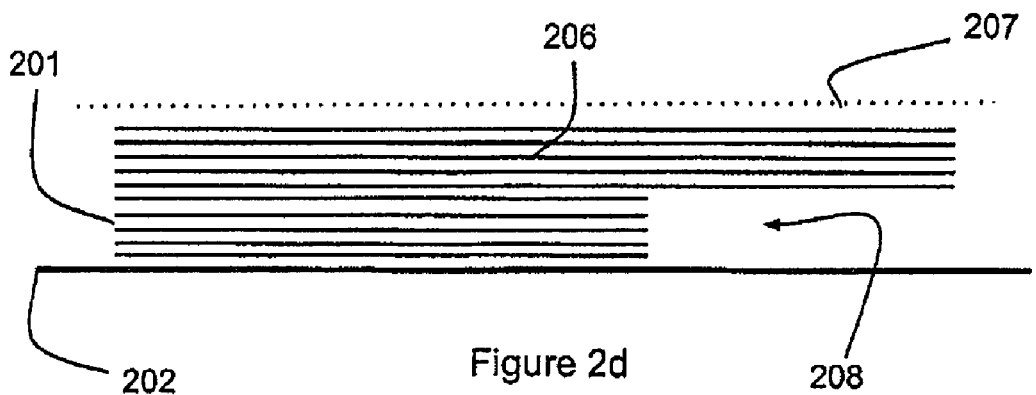

The leading and trailing edge structures 104, 105 are formed by conventional means from aluminium alloy. The wing cover panels 102, 103 and the access panel 108 are formed from a composite material, in the form of layers of carbon fibre laminate bound by an epoxy resin. The process of forming the rebates 106 in the wing cover panels 102, 103 will now be described with reference to FIGS. 2a to 2d. Initially, a first set of laminate layers 201 are laid on a tool surface 202, interspersed with epoxy resin. In the present embodiment, there are five layers in the first set of layer and the tool surface 202 is planar. With reference to FIG. 2b, a cut 203 is made in the first set of layers and the severed part 204 of the set of layers is removed. This removed part 204 is then wrapped in release film 205 to form a mandrel, which is then replaced in its original position on the tool 202 as shown in FIG. 2c. The removed part or mandrel 204 serves to form a space in the composite material what will provide the rebate 106. Once the mandrel 204 is in place, a second set of laminate layers 206 are laid over the first set of layers 201 and the mandrel 204, completing the lamination of the piece. The appropriate conventional curing process for the composite material is then applied, which includes wrapping the whole piece in release film, encapsulating the wrapped piece in a vacuum bag, removing the air from the vacuum bag and curing the whole assembly in an autoclave. The curing process results in shrinkage or compaction of the piece, as shown by the original height of the piece 207 in FIG. 2d. When the piece has been cured, the mandrel 204 is removed leaving a space 208 providing the rebate 106 in an edge of the wing cover panel 102. The piece then goes through a conventional finishing process.

Figure 3A:
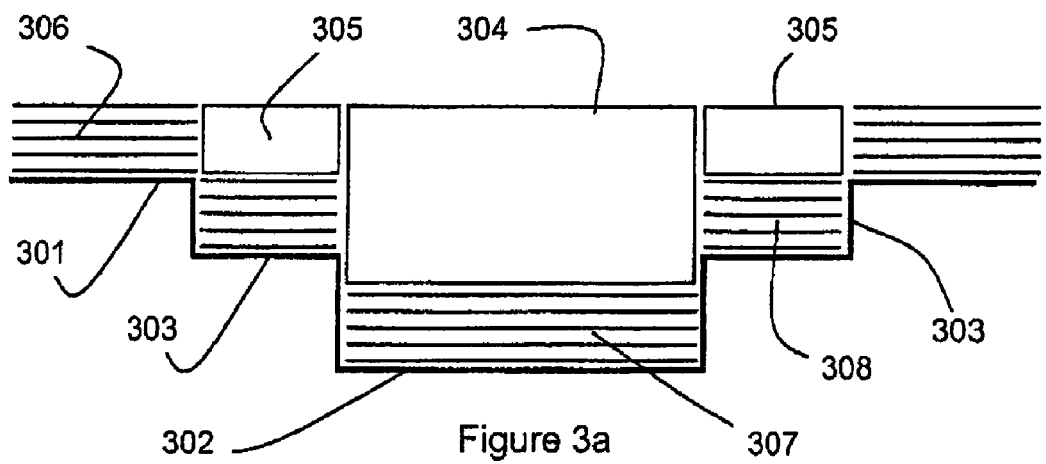
FIGS. 3a to 3c are a set of cross sectional views illustrating a second process for forming a rebated aperture in a composite panel for use in the wing of FIG. 1.

The process of forming the rebated aperture 107 will now be described with reference to FIGS. 3a to 3c. The surface of a tool 301 comprises a first rebate 302 and a second rebate 303 that runs around the rim of the first rebate 302. The two rebates form annular troughs with cross-sections that conform to the required shape of the aperture 107 and its rebate respectively, in the plane of the aerofoil surface of the cover panel. Two fixed depth mandrels 304, 305 are arranged to conform with the first and second troughs 302, 303 respectively. The first set of laminate layers 306 is laid over the tool surface 301 and flush with the upper surfaces of the mandrels 304, 305. The first set of layers 306 is then cut where they overlay the edges of the troughs 302, 303. The cut out sections 307, 308 are then placed within their respective troughs 302, 303 below their respective mandrels 304, 305 as shown in FIG. 3a.

Figure 3B:
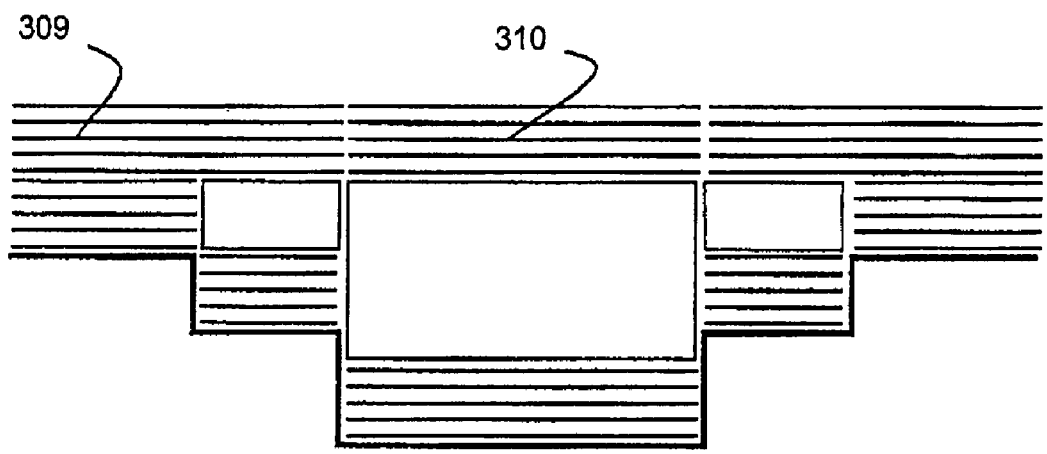
Figure 3C:
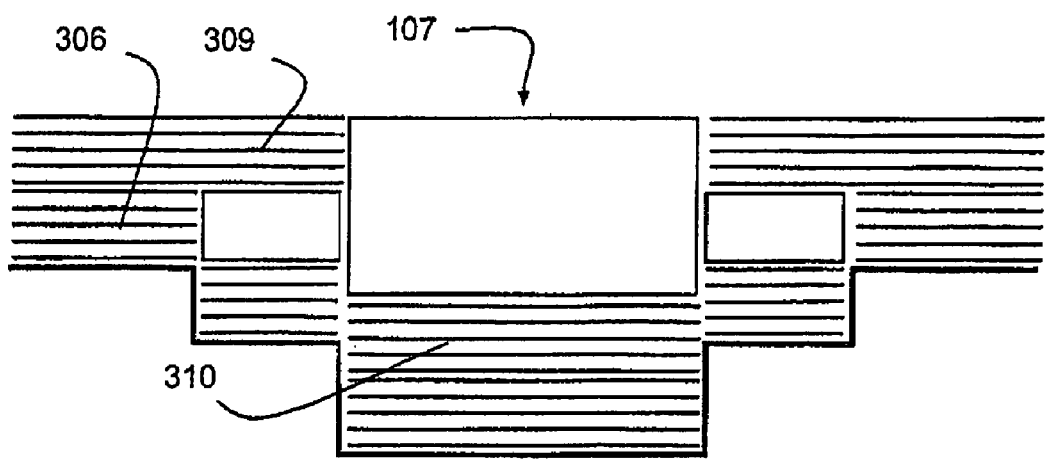

As shown if FIG. 3b, a second set of laminate layers 309 is then laid over the remaining parts of the first set of layers 306 and the mandrels 304, 305. This second set of layers 309 is then cut where they overlay the edge of the first trough 302. The removed section 310 therefore conforms to the first mandrel 304 and thus the desired aperture 107. The removed section is then placed within the first trough 302 below the first mandrel 304 as shown in FIG. 3c. The piece is then cured as described above resulting in a rebated aperture being formed in the piece from the remaining parts of the first and second sets of layers 306, 309.

Figure 4A:
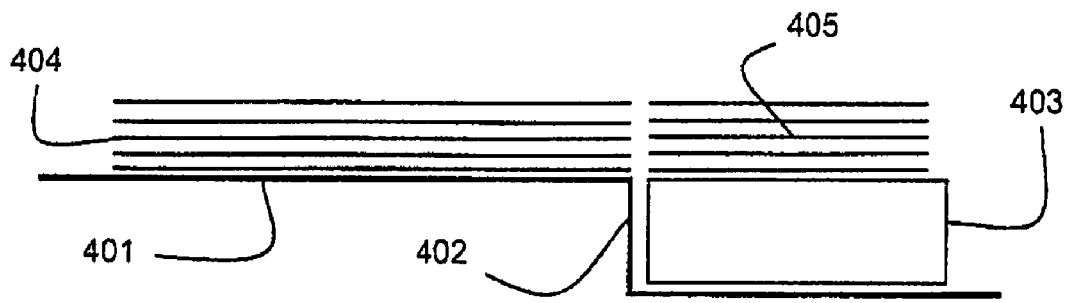
FIGS. 4a to 4c are a set of cross sectional views illustrating a process according to another embodiment for forming a rebate in a composite panel.
Figure 4B:
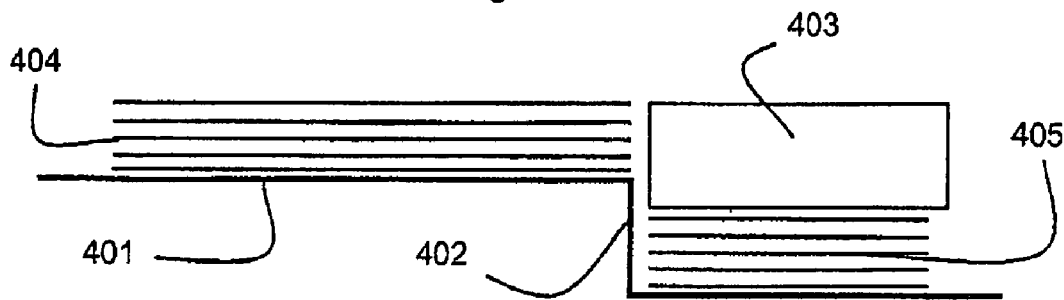
Figure 4C:
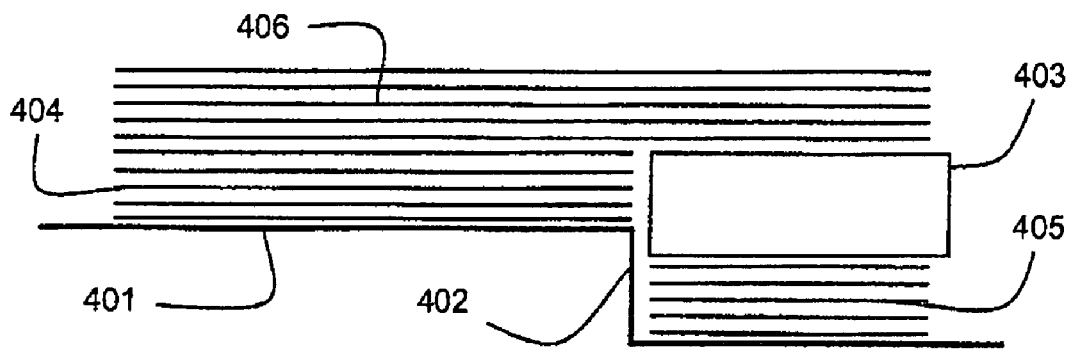

In another embodiment, as shown in FIG. 4a, a tool surface 401 comprises a single rebate 402 and a mandrel 403 is provided that conforms to the rebate 402. A first set of layers 404 is laid over the tool surface 401 and the upper surface of the mandrel 403. The first set of layers 404 is then cut where they overlay the edge of the rebate 402. The part 405 of the first set of layers 404 overlying the mandrel 403 is then removed. As shown in FIG. 4b, the removed part 405 is then place within the rebate 402 below the mandrel 403. As shown in FIG. 4c, a second set of laminate layers 406 is then laid over the first set of layers 404 and the upper exposed surface of the mandrel 403. The piece is then cured resulting in a panel formed from the first and second layers 404, 406 having a rebate conforming to the mandrel 403.

Figure 5:
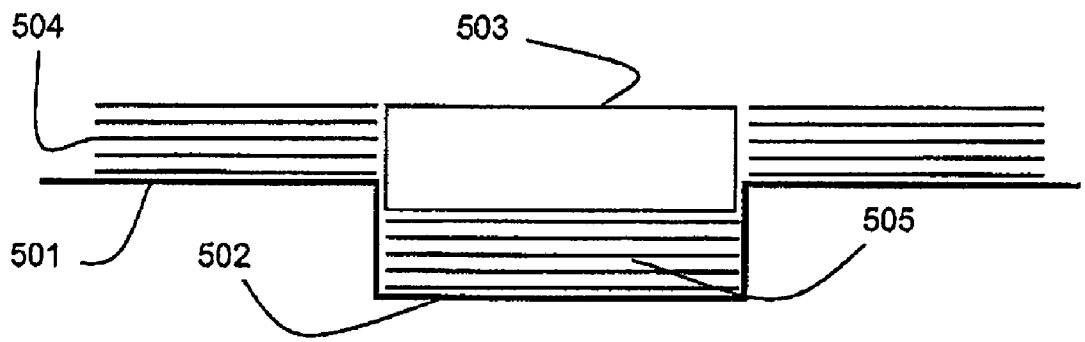
FIG. 5 is a cross sectional view illustrating a process according to a further embodiment for forming a feature in a composite panel.

In a further embodiment, as shown in FIG. 5, a tool surface 501 comprises a trough 502 and a corresponding mandrel 503. The mandrel 503 is placed in the trough 502 and a set of laminate layers 504 are laid over the tool surface 501 and the flush upper surface of the mandrel 503. The layers 504 are then cut where they overlay the edge of the trough 502 and the removed part 505 is placed within the trough 502 below the mandrel 503 prior to curing the piece. Thus an aperture conforming to the mandrel 503 is formed in the finished piece.

As will be understood by those skilled in the art, the troughs or rebates and corresponding mandrels may be arranged to form any required shape of aperture or rebate in the piece being formed. For example, the trough and mandrel may be elliptical or rhomboid, symmetrical or asymmetrical. Furthermore, while each of the features being formed in the above embodiment is shown in isolation, any combination of the processes may be used to form a plurality of such features in a piece of composite material.

In the above embodiments, having a mandrel that at least partly comprises the removed part of a set of layers enables the mandrel to move during the curing process in a manner that substantially matches the shrinkage or compaction of the piece. In other words, the relative movement of the mandrel and the piece is substantially eliminated. This feature reduces the occurrence of kinked laminate layers, burred edges or boundaries of formed features and air pockets. Reducing such anomalies can increase the accuracy and reliability of manufacturing process. One or more layers may be removed from the removed part prior to it providing at least part of a mandrel. In other embodiments, instead of using the removed part to form at least part of a mandrel, a set of one or more layers of laminate may be cut specifically for the purpose. In further embodiments, any layers of laminate that contribute to the mandrel are wrapped in release film in the same manner as FIG. 2c. In another embodiment, instead of forming a mandrel from a fixed part and a laminate layer part, the whole of the or each mandrel is formed from layers of laminate which may be removed parts or specially cut and may be wrapped in release film.

Composite materials having features according to the above embodiments may be used in any other application of composite materials such as other parts of an aircraft, other structures including land craft such as cars, watercraft such as boats or ships or spacecraft. Laminate materials include nonmetallic materials such as glass fibre, boron fibre, carbon fibre, Kevlar™ and graphite or metallic materials such as aluminium, titanium or magnesium. Suitable resins include, epoxy, bismaleimide, polyimide, polyester, phenolic and thermoplastic resins. A given structure may be made from a combination of parts formed from different composite material combinations. As will be understood by those skilled in the art, some resins such as thermosetting resins are set using a thermo-chemical curing process. Other resins such as thermoplastic resins set by being allowed to cool below their setting temperature. The term "curing" used herein is intended to be construed so as to include setting of thermoplastic resins.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for forming a feature in a piece of engineered composite material, the method comprising the steps of:
   laying a first set of layers of a composite material for said piece on a tool surface;
   removing a first part of said first set of composite layers;
   forming a first mandrel comprising said removed part of said composite layers, said first mandrel configured to conform to said feature in said piece;
   inserting said first mandrel in place of said removed first part of said first set of layers;
   laying a second set of layers of a composite material for said piece over said first set of composite layers and said first mandrel;
   curing said piece; and
   removing said first mandrel.

2. A method according to claim 1 in which said forming a first mandrel comprises wrapping said removed first part of said first set of composite layers in release film.

3. A method according to claim 1 in which one or more layers are removed from said removed first part of said first set of composite layers prior to forming said first mandrel.

4. A method according to claim 1 in which said tool surface comprises a first rebate and said first mandrel conforms to said first rebate and comprises a lower part formed from said removed first part of said first set of composite layers and an upper fixed part conforming to said feature to be formed in said piece, said removed first part of said first set of composite layers being the part of said first set of composite layers laid over said first rebate.

5. A method for forming a feature in a piece of engineered composite material, the method comprising the steps of:
   laying a first set of layers of a composite material for said piece on a tool surface;
   removing a first part of said first set of composite layers;
   forming a first mandrel comprising said removed part of said composite layers, said first mandrel configured to conform to said feature in said piece;
   inserting said first mandrel in place of said removed first part of said first set of layers;
   curing said piece; and
   removing said first mandrel in which said tool surface comprises a first rebate and said first mandrel conforms to said first rebate and comprises a lower part formed from said removed first part of said first set of composite layers and an upper fixed part conforming to said feature to be formed in said piece, said removed first part of said first set of composite layers being the part of said first set of composite layers laid over said first rebate, in which said first rebate forms a trough, and said first set of composite layers is laid across said trough so as to enable said first mandrel to form an aperture in said piece.

6. A method according to claim 4 in which said first rebate is arranged to form a first trough within a second rebate in the form of a second trough, said method comprising the further steps of
   prior to laying said second set of composite layers, removing the second part of said first set of composite layers laid over said second rebate and inserting a second mandrel in said second trough, said second mandrel comprising a lower part formed from said removed second part of said first set of composite layers and an upper fixed part conforming to said second trough; and
   after laying said second set of composite layers and prior to curing said piece, removing a part of said second set of composite layers and adding said removed part of said second set of layers to said lower part of said first mandrel.

7. A method according to claim 6 in which said second rebate is formed in two parts running either side of said first rebate.

8. A method according to claim 6 in which said second rebate runs continuously around said first rebate.

9. A method according to claim 1 wherein said composite material comprises a thermoplastic resin and said curing step comprises the setting of said thermoplastic resin.

10. A method for forming a piece of composite material to include a formed feature, the method comprising the steps of:
   a) laying a first set of composite layers for said piece on a tool surface;
   b) removing a part of said first set of composite layers;
   c) forming a mandrel from said removed part of said first set of layers wrapped in a release film, said mandrel conforming to a feature to be formed in said piece;
   d) inserting said mandrel in place of said removed part of said first set of composite layers;
   e) laying a second set of composite layers for said piece over said first set of composite layers and said mandrel; and
   f) curing and finishing said piece.

11. A method according to claim 10 wherein said composite material comprises a thermoplastic resin and said curing step comprises the setting of said thermoplastic resin.

12. A method for forming a feature in a piece of composite material, the method comprising the steps of:
   a) laying a first set of composite layers for said piece on a tool surface;
   b) removing a first part of said first set of composite layers;
   c) inserting a first mandrel in place of said removed first part of said first set of composite layers, said first mandrel being arranged to conform to a feature to be formed in said piece and to have substantially the same rate of compaction during curing as said removed first part of said set of composite layers;
   d) laying a second set of composite layers for said piece over said first set of composite layers and said first mandrel; and
   e) curing said piece, wherein said first mandrel is formed from said removed first part of said first set of composite layers and said removed first part of said first set of composite layers is wrapped in release film.

* * * * *